United States Patent
Wang et al.

(10) Patent No.: US 11,093,361 B2
(45) Date of Patent: Aug. 17, 2021

(54) BUS MONITORING SYSTEM, METHOD AND APPARATUS

(71) Applicant: ZTE CORPORATION, Guangdong (CN)

(72) Inventors: Jinrong Wang, Guangdong (CN); Zhongyun Yu, Guangdong (CN); Xiaoyu Bao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/627,720

(22) PCT Filed: Jul. 12, 2018

(86) PCT No.: PCT/CN2018/095429
§ 371 (c)(1),
(2) Date: Dec. 30, 2019

(87) PCT Pub. No.: WO2019/052275
PCT Pub. Date: Mar. 21, 2019

(65) Prior Publication Data
US 2020/0142798 A1 May 7, 2020

(30) Foreign Application Priority Data
Sep. 12, 2017 (CN) .......................... 201710819085.X

(51) Int. Cl.
G06F 11/30 (2006.01)
G06F 11/07 (2006.01)
(Continued)

(52) U.S. Cl.
CPC ...... G06F 11/3027 (2013.01); G06F 11/0772 (2013.01); G06F 11/0787 (2013.01);
(Continued)

(58) Field of Classification Search
CPC ............. G06F 11/3027; G06F 11/0772; G06F 11/0787; G06F 11/1016
(Continued)

(56) References Cited

U.S. PATENT DOCUMENTS

2008/0062989 A1* 3/2008 Coupal ................... H04L 43/18
370/392
2009/0087179 A1* 4/2009 Underwood ............ H04L 43/50
398/25
(Continued)

FOREIGN PATENT DOCUMENTS

CN 103840956 A 6/2014
CN 104914849 A 9/2015
(Continued)

OTHER PUBLICATIONS

Wikipedia "reboot" page from date Aug. 12, 2017, retrieved using the WayBackMachine, retrieved fromhttp://web.archive.org/web/
(Continued)

Primary Examiner — Yair Leibovich
(74) Attorney, Agent, or Firm — Li & Cai Intellectual Property (USA) Office

(57) ABSTRACT

A bus monitoring system, a method and an apparatus, wherein the system comprises: a bus node; a bus monitoring module configured to monitor a first bus where the bus monitoring module is located to generate monitoring information; an information storage module configured to acquire the monitoring information from the bus monitoring module through a second bus; the first bus being configured to connect a master device and a slave device of the bus node; the second bus being configured to connect the information storage module and the bus monitoring module, wherein the second bus is independent from the first bus. By means of the present disclosure, the technical problem that bus moni-
(Continued)

toring information cannot be acquired when bus exception occurs in the related art is solved.

15 Claims, 7 Drawing Sheets

(51) Int. Cl.
 G06F 11/10 (2006.01)
 G06F 11/14 (2006.01)
 G06F 11/22 (2006.01)
(52) U.S. Cl.
 CPC ........ *G06F 11/1016* (2013.01); *G06F 11/141* (2013.01); *G06F 11/221* (2013.01)
(58) Field of Classification Search
 USPC .......................................................... 714/43
 See application file for complete search history.

(56) References Cited

U.S. PATENT DOCUMENTS

| 2009/0276666 | A1 | 11/2009 | Haley et al. |
| 2010/0241907 | A1 | 9/2010 | Nakamura et al. |
| 2011/0191610 | A1* | 8/2011 | Agarwal ................. H04L 12/12 713/310 |
| 2014/0143463 | A1* | 5/2014 | Mou .................... G06F 11/3027 710/110 |

FOREIGN PATENT DOCUMENTS

| CN | 104951385 A | 9/2015 |
| CN | 105372151 A | 3/2016 |
| CN | 106919462 A | 7/2017 |
| EP | 2472408 A | 7/2012 |
| JP | H02284249 A | 11/1990 |
| JP | H11203174 A | 7/1999 |
| JP | 2003177975 A | 6/2003 |
| JP | 2005285040 A | 10/2005 |
| JP | 2010226181 A | 10/2010 |
| JP | 2011076295 A | 4/2011 |
| WO | WO 2009000207 A1 | 12/2008 |
| WO | WO 2017092459 A1 | 6/2017 |

OTHER PUBLICATIONS

20160810172911/https://en.wikipedia.org/wiki/Reboot_%28computing%29 (Year: 2017).
*WIPO International Search Report dated Sep. 15, 2018.
Japan Patent Office, First Office Action dated Feb. 2, 2021, for corresponding Japanese application No. 2019-572374.
European Patent Office, Extended European Search Report dated May 17, 2021, for corresponding EP application No. 18856083.3.

* cited by examiner

BUS MONITORING SYSTEM, METHOD AND APPARATUS

FIELD OF THE INVENTION

The present disclosure relates to the field of processors, and in particular to a bus monitoring system, method and apparatus.

BACKGROUND

With the improvement of the product performance of mobile communication system, the number of integrated processors and peripherals in a chip used by the mobile communication system becomes larger and larger, which results in more and more complex bus. In order to facilitate fault location, the chip in the related art is designed with a bus monitoring module for monitoring access information of respective bus nodes, as shown in FIG. 1. FIG. 1 is a diagram of a bus monitoring apparatus in the related art of the present disclosure. In this way, if bus exception occurs, the processors or the peripherals cannot be accessed through the bus, thus it is impossible to acquire bus monitoring information, which further makes it difficult to locate the fault.

In view of the technical problem above in the related art, an effective solution has not been proposed yet.

SUMMARY

The embodiments of the present disclosure provide a bus monitoring system, a method and an apparatus, to solve at least the technical problem that bus monitoring information cannot be acquired in case of bus exceptions in the related art.

According to an embodiment of the present disclosure, there is provided a bus monitoring system, comprising: a bus node; a bus monitoring module configured to monitor a first bus where the bus monitoring module is located to generate monitoring information; an information storage module configured to acquire the monitoring information from the bus monitoring module through a second bus; the first bus being configured to connect a master device and a slave device of the bus node; the second bus being configured to connect the information storage module and the bus monitoring module; wherein the second bus is independent of the first bus.

Optionally, the second bus is further configured to execute at least one of the following: backing up data of a chip where the bus node is located, and expanding a flow of a path for a designated use.

Optionally, the system further comprises: a chip reset module configured to execute a reset operation on the chip where the bus node is located, when detecting an indication that the monitoring information is saved; and a fault analysis module configured to perform fault analysis based on the monitoring information.

Optionally, the system further comprises a storage module configured to store the monitoring information.

Optionally, the second bus is further configured to connect the information storage module and the storage module.

According to another embodiment of the present disclosure, there is provided a bus monitoring method, comprising: monitoring a first bus where a bus monitoring module is located to generate monitoring information; acquiring the monitoring information from the bus monitoring module through a second bus; wherein the second bus is independent of the first bus.

Optionally, the step of acquiring the monitoring information from the bus monitoring module through a second bus includes one of: acquiring the monitoring information from the bus monitoring module through the second bus according to event trigger; acquiring the monitoring information from the bus monitoring module through the second bus according to query state; and acquiring monitoring information from the bus monitoring module through the second bus according to continuous storage.

Optionally, after acquiring the monitoring information from the bus monitoring module through the second bus, the method further includes saving the monitoring information.

Optionally, after saving the monitoring information, the method further includes: executing a reset operation on a chip where the bus node is located; and performing fault analysis based on the monitoring information after the reset operation is completed.

Optionally, the step of executing a reset operation on a chip where the bus node is located includes executing a reset operation on the chip where the bus node is located, when detecting an indication that the monitoring information is saved.

Optionally, the step of performing fault analysis based on the monitoring information includes: deducing an access model of the chip based on the monitoring information; and locating a fault type according to the access model.

Optionally, the step of performing fault analysis based on the monitoring information includes: traversing all master devices to read a serial number of a bus node directly connected with a current master device; reading historical access information of a corresponding bus node according to the serial number of the bus node; analyzing the historical access information to detect whether the current master device initiates access; when an access is initiated, judging whether an access address is in a legal range or not; when the access address is not in the legal range, recording at least one piece of the following node information: master device serial number, access address, and access attribute; and locating a master device of illegal access according to the node information.

Optionally, after performing fault analysis based on the monitoring information, the method further includes: determining a fault bus node; when a current bus node initiates access, detecting whether an access address of the fault bus node is legal or not; and when the access address of the fault bus node is illegal, prohibiting access to the fault bus node.

Optionally, the step of monitoring a first bus where the bus monitoring module is located to generate monitoring information includes: monitoring access information of the bus node through the first bus, and saving the access information to a bus monitoring module to obtain the monitoring information of the bus node.

Optionally, the step of acquiring the monitoring information from the bus monitoring module through the second bus includes: when the current access information indicates that the bus node is abnormal, acquiring the monitoring information from the bus monitoring module through the second bus; when the current access information indicates that the bus node is normal, acquiring the monitoring information from the bus monitoring module through the second bus.

According to still another embodiment of the present disclosure, there is provided a bus monitoring apparatus including: a monitoring module configured to monitor a first bus where the bus monitoring module is located to generate monitoring information; an acquisition module configured to acquire the monitoring information from the bus monitoring module through a second bus; wherein the second bus is independent of the first bus.

Optionally, the acquisition module includes one of the following: a first acquisition unit configured to acquire the monitoring information from the bus monitoring module through the second bus according to event trigger; a second acquisition unit configured to acquire the monitoring information from the bus monitoring module through the second bus according to query state; and a third acquisition unit configured to acquire the monitoring information from the bus monitoring module through the second bus according to continuous storage.

Optionally, the apparatus further includes: a reset module configured to execute a reset operation on a chip where the bus node is located after the storage module saves the monitoring information; an analysis module configured to perform fault analysis based on the monitoring information.

Optionally, the apparatus further includes: a determination module configured to determine a fault bus node after the analysis module performs the fault analysis based on the monitoring information; a detection module configured to detect whether the access address of the fault bus node is legal or not when the current bus node initiates access; and a processing module configured to prohibit access to the fault bus node when the access address of the fault bus node is illegal.

Optionally, the apparatus further includes a storage module configured to save the monitoring information.

According to yet another embodiment of the present disclosure, there is also provided a storage medium. The storage medium is configured to store a program code for performing the steps of:

monitoring a first bus where a bus monitoring module is located to generate monitoring information; and acquiring the monitoring information from the bus monitoring module through a second bus.

In the present disclosure, a second bus is added on the basis of a first bus, and the second bus is used for acquiring monitoring information to ensure that the bus monitoring information can also be acquired in case of bus exceptions, which solves the technical problem that bus monitoring information cannot be acquired in case of bus exceptions in the related art, and improves the bus node monitoring efficiency.

BRIEF DESCRIPTION OF THE DRAWINGS

The accompanying drawings, which constitute a part of the present disclosure, are provided for facilitating understanding of embodiments of the present disclosure. The exemplary embodiments of the present disclosure and descriptions thereof are illustrative of the present disclosure, but are not intended to unduly limit the scope of the present disclosure. In the drawings.

DETAILED DESCRIPTION OF THE EMBODIMENTS

The present disclosure will be described in detail below with reference to the accompanying drawings in conjunction with embodiments. It should be noted that the embodiments of the present application and the features thereof can be combined with each other in case of no conflict.

It should be noted that the terms "first", "second" and the like in the description and claims of the present disclosure and in the above-described drawings are used for distinguishing between similar elements, without necessarily for describing a particular sequential or chronological order.

First Embodiment

Figure 1:
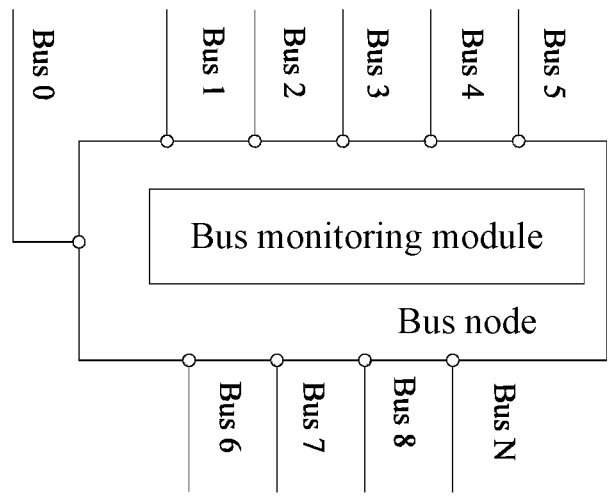
FIG. 1 is a diagram of a bus monitoring apparatus in the related art of the present disclosure.
Figure 2:
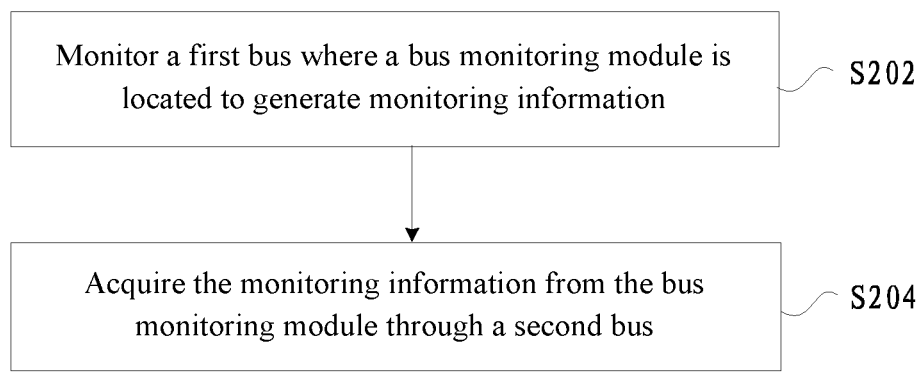
FIG. 2 is a flowchart of a bus monitoring method according to an embodiment of the present disclosure.

A bus monitoring method is provided in the present embodiment. FIG. 2 is a flowchart of a bus monitoring method according to an embodiment of the present disclosure. As shown in FIG. 2, the flowchart includes the following steps.

Step S202, monitoring a first bus where a bus monitoring module is located to generate monitoring information;

Step S204, acquiring the monitoring information from the bus monitoring module through a second bus.

By the foregoing steps, a second bus is added on the basis of the first bus, and the second bus is used for acquiring monitoring information, so that the bus monitoring information can also be acquired in case of bus exceptions, which solves the technical problem that the bus monitoring information cannot be acquired in case of bus exceptions in the related art, and improves the bus node monitoring efficiency.

Optionally, the execution body of the above steps may be a bus node, specifically be but not limited to a processor, a chip, a bus management device, and the like.

Optionally, after Step S204, the scheme of the embodiment further includes: Step S206, saving the monitoring information.

Optionally, the step of acquiring the monitoring information from the bus monitoring module through the second bus includes one steps of:

acquiring the monitoring information from the bus monitoring module through the second bus according to event trigger;

acquiring the monitoring information from the bus monitoring module through the second bus according to query state; and acquiring the monitoring information from the bus monitoring module through the second bus according to continuous storage.

Optionally, the step of saving the monitoring information may be but not limited to, saving the monitoring information into a local ROM space; saving the monitoring information into a local RAM space; saving the monitoring information into a remote ROM space; and saving the monitoring information into a remote RAM space. Specifically, the ROM may be Flash, the RAM may be DDR (Double Data Rate SDRAM).

Optionally, after saving the monitoring information, the method further includes:

S11, executing a reset operation on the chip where the bus node is located; and

S12, after the reset operation is completed, performing fault analysis based on the monitoring information.

In the present embodiment, the step of executing the reset operation on the chip where the bus node is located includes executing the reset operation on the chip where the bus node is located, when detecting an indication that the monitoring information is saved.

Optionally, the step of performing fault analysis based on the monitoring information includes:

S21, deducing an access model of the chip based on the monitoring information; wherein the access model is established according to a connection access relation of each bus node in the chip; and S22, locating a fault type according to the access model.

Optionally, the step of performing fault analysis based on the monitoring information includes:

S31, traversing all master devices to read the serial number of the bus node directly connected with the current master device;

S32, reading the historical access information of the corresponding bus node according to the serial number of the bus node;

S33, analyzing the historical access information to detect whether the current master device initiates access;

S34, when an access is initiated, judging whether the access address is in a legal range or not;

S35, when the access address is not in the legal range, recording at least one piece of the following node information: the serial number of the bus node, the access address, and the access attribute; and S36, locating the master device of illegal access according to the node information.

Optionally, after performing the fault analysis based on the monitoring information, the method further includes:

S41, determining a fault bus node;

S42, when the current bus node initiates access, detecting whether the access address of the fault bus node is legal or not;

S43, when the access address of the fault bus node is illegal, prohibiting access to the fault bus node.

Optionally, the step of acquiring the monitoring information from the bus monitoring module through the second bus includes: when the current access information indicates that the bus node is abnormal, acquiring the monitoring information from the bus monitoring module through the second bus; and when the current access information indicates that the bus node is normal, acquiring the monitoring information from the bus monitoring module through the second bus.

Optionally, the step of monitoring the first bus where the bus monitoring module is located to generate monitoring information includes: monitoring the access information of the bus node through the first bus, and storing the access information to the bus monitoring module to obtain the monitoring information of the bus node.

Through the above description of the embodiments, those skilled in the art can clearly understand that the method according to the above embodiments can be implemented by software plus a necessary general hardware platform, and certainly can also be implemented by hardware, but the former is a better implementation mode in many cases. Based on such understanding, the technical solutions of the present disclosure may be embodied in the form of a software product, which is stored in a storage medium (e.g., ROM/RAM, magnetic disk, optical disk) and includes instructions for enabling a terminal device (e.g., a mobile phone, a computer, a server, or a network device) to execute the method according to the embodiments of the present disclosure.

Second Embodiment

In the present embodiment, a bus monitoring apparatus and a bus monitoring system are further provided for implementing the foregoing embodiments and preferred implementations. The description which has been set fourth will be omitted. As used below, the term "module" can implement a combination of software and/or hardware with predetermined functions. Although the apparatus described by the following embodiments is preferably implemented by software, it is also possible and conceivable to implement the apparatus by hardware or a combination of software and hardware.

Figure 3:
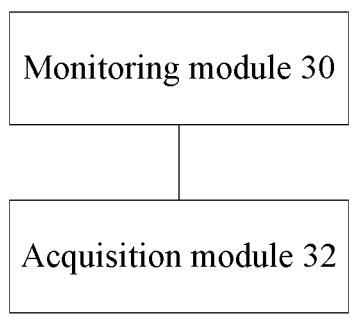
FIG. 3 is a block diagram illustrating a structure of a bus monitoring apparatus according to an embodiment of the present disclosure.

FIG. 3 is a block diagram illustrating a structure of a bus monitoring apparatus according to an embodiment of the present disclosure. The bus monitoring apparatus is applicable to a chip or the like, particularly a multiprocessor chip. As shown in FIG. 3, the bus monitoring apparatus includes:

a monitoring module 30 configured to monitor a first bus where the bus monitoring module is located to generate monitoring information; and an acquisition module 32 configured to acquire the monitoring information from the bus monitoring module through a second bus.

Optionally, the apparatus further includes a storage module configured to store the monitoring information.

Optionally, the acquisition module includes one of: a first acquisition unit configured to acquire the monitoring information from the bus monitoring module through the second bus according to event trigger; a second acquisition unit configured to acquire the monitoring information from the bus monitoring module through the second bus according to query state; and a third acquisition unit configured to acquire the monitoring information from the bus monitoring module through the second bus according to continuous storage.

Optionally, the apparatus further includes: a reset module configured to execute a reset operation on the chip where the bus node is located after the storage module saves the monitoring information; a fault analysis module configured to perform fault analysis based on the monitoring information.

Optionally, the apparatus further includes: a determination module configured to determine a fault bus node after the analysis module performs the fault analysis based on the monitoring information; a detection module configured to detect whether the access address of the fault bus node is legal or not when the current bus node initiates access; a processing module configured to prohibit access to the fault bus node when the access address of the fault bus node is illegal.

Figure 4:
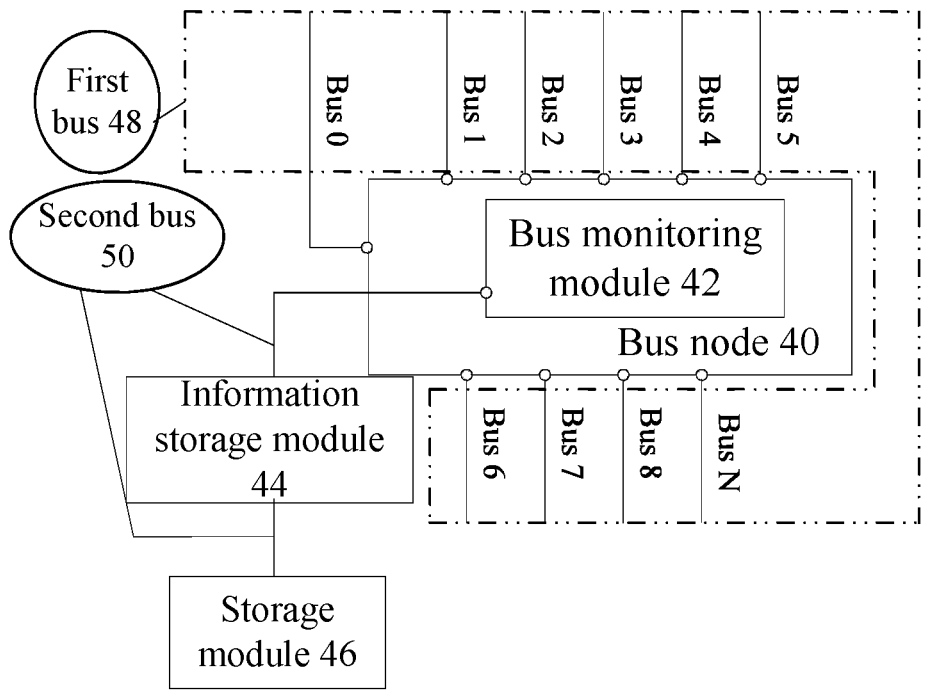
FIG. 4 is a block diagram illustrating a structure of a bus monitoring system according to an embodiment of the present disclosure.

FIG. 4 is a block diagram illustrating a structure of a bus monitoring system according to an embodiment of the present disclosure. As shown in FIG. 4, the bus monitoring system includes:

a bus node 40;

a bus monitoring module 42 configured to monitor a first bus where the bus monitoring module is located to generate monitoring information;

an information storage module 44 configured to acquire the monitoring information from the bus monitoring module through the second bus;

a first bus 48 configured to connect a master device and a slave device of the bus node;

a second bus 50 configured to connect the information storage module and the bus monitoring module, and to connect the information storage module and the storage module;

wherein, the second bus is independent of the first bus.

Optionally, the system further includes a storage module 46 configured to store the monitoring information. Optionally, the second bus is also configured to connect the information storage module and the storage module.

Optionally, the second bus is further configured to perform at least one of: backing up data of a chip where the bus node is located, and expanding traffic flow of a path for a designated use.

Optionally, the system further includes: a chip reset module configured to perform a reset operation on a chip where the bus node is located, when detecting an indication that the monitoring information is saved; and a fault analysis module configured to perform fault analysis based on the monitoring information.

It should be noted that, the above modules may be implemented by software or hardware. The hardware may be implemented by, but not limited to, the above-described modules located in the same processor; or the above-described modules located in different processors in any combination.

Third Embodiment

The present embodiment is an alternative embodiment according to the present disclosure, and is used for supplementing and detailing the present application in combination with specific examples and scenarios.

The embodiment provides a method for storing bus node information in a multiprocessor chip by adding a second bus and an information storage module on the basis of a bus monitoring module, so as to ensure that when a bus exception occurs, bus monitoring information can be acquired and exception analysis can be performed. The scheme of the embodiment ensures that the monitoring information of the bus node can be acquired in case of bus exceptions, thereby locating fault quickly and accurately.

Figure 5:
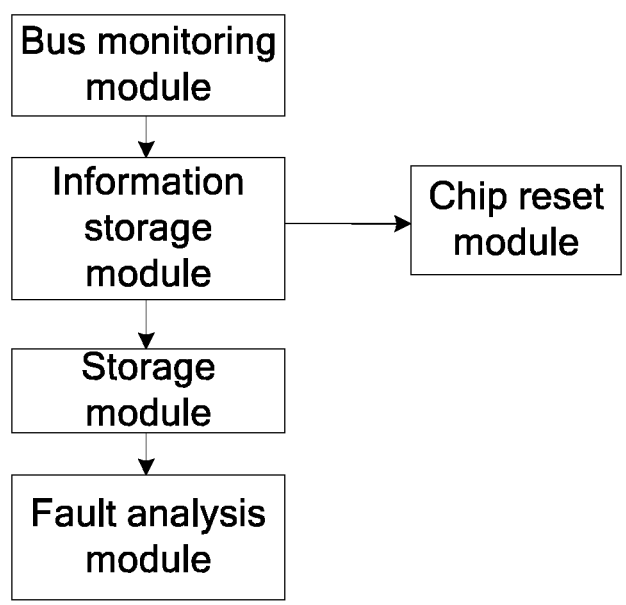
FIG. 5 is a block diagram of a bus monitoring apparatus of an embodiment of the present disclosure.

The multiprocessor chip bus monitoring apparatus described in the present disclosure includes the following modules: a bus monitoring module, an information storage module, a memory, a chip reset module, and a fault analysis module. FIG. 5 is a block diagram of the bus monitoring apparatus according to the embodiment of the present disclosure.

The information storage module of the device of the present disclosure reads the monitoring information from the bus monitoring module (monitoring the first bus) through the second bus (shown in FIG. 4) and stores the information into the memory; and, after the storage is completed, informs the chip reset module to reset the chip; and the fault analysis module acquires the monitoring information from the memory to perform exception analysis.

The first bus (buses 0-N shown in FIG. 4 all belong to the first bus) is a path connecting a master device and a slave device. Master devices such as processors and peripherals access slave devices such as DDR and bus monitoring unit through the first bus.

The second bus is used for the information storage module to access the bus monitoring module and the memory, and the monitoring information of the bus monitoring module is stored in the memory through the second bus. The second bus is independent of the first bus, namely, when exception occurs at the first bus, the second bus can also access the bus monitoring module; and The second bus can also be used for backing up the chip, and expanding the traffic flow.

The bus nodes are a plurality of bus (bus 0-bus N) inlets and outlets, and the bus monitoring module can monitor one or more bus nodes.

The bus monitoring module is responsible for capturing bus (bus 0-bus N) access information of the bus nodes; the bus monitoring module includes a configuration part, a monitoring part and an event generating part. The configuration part receives configuration information, the monitoring part monitors the bus according to the configuration and writes the captured monitoring information into a register space of the bus monitoring module; an event generating part generates an event in case of exception and sets an exception state.

Figure 6:
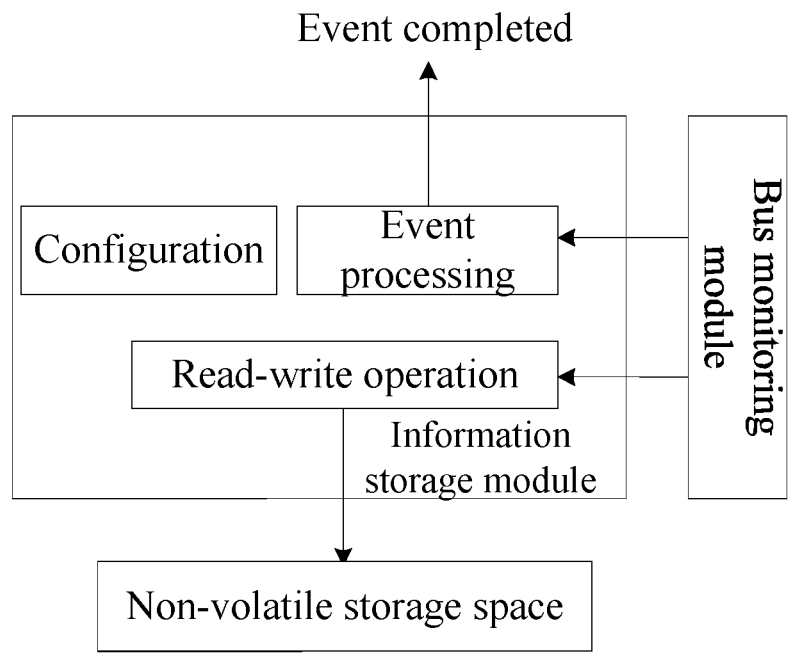
FIG. 6 is a diagram illustrating a structure of an information storage module of an embodiment of the present disclosure.

The information storage module is responsible for bus monitoring information storage and memory space management; the information storage module includes a configuration part, a read-write operation part and an event processing part. FIG. 6 is a diagram illustrating a structure of an information storage module according to the embodiment of the present disclosure (see FIG. 6, diagram illustrating a structure of the information storage module).

The information storage module uses a second bus, the second bus being independent of the first bus where the bus monitoring module is located, so that the information storage module can also execute operation in case of bus exceptions.

The configuration part mainly configures operation modes, including query, event trigger and continuous storage. The query mode refers to inquiring the state of the bus monitoring module; the event trigger refers to responding to the exception event of the bus monitoring module; the continuous storage mode refers to that the information storage module continuously stores access information captured by the bus monitoring module.

The read-write operation part writes the monitoring information of the bus monitoring module into the memory, and the operation mode being controlled by configuration. The read-write operation part manages the storage space of the memory according to the bus nodes, to ensure the exactness of the information of each bus node.

The event processing part mainly receives exception events sent by the bus monitoring module, generates read-write completion events and sets completion flags after the storage operation is completed.

The information storage module may complete information storage of one or more bus monitoring modules.

The memory may be a ROM/RAM space in the monitoring bus chip or an RAM/ROM space outside the chip for storing monitoring information.

The chip reset module executes a chip reset operation. The chip reset module is mainly responsible for inquiring the execution state of the information storage module or receiving completion events transmitted from the information storage module, and executing the chip reset operation according to the state or event.

The fault analysis module is responsible for problem locating analysis, and in case of bus exceptions, deducing the chip access model according to the access information of the bus monitoring node in the memory, and finding out abnormal access.

The multiprocessor chip bus monitoring method of the present embodiment includes the following steps:

Step 1, the bus monitoring module captures first bus access information.

Step 2, the information storage module acquires monitoring information from the bus monitoring module through a second bus according to different operation modes, and stores the monitoring information into the memory.

The operation modes include event trigger, query state, and continuous storage.

The memory may be an on/off-chip ROM, such as Flash, or an on/off-chip RAM, such as DDR; in the case of RAM, it is necessary to ensure that information is not lost during the reset process.

After the completion of the storage, the information storage module generates a completion event and sets a completion flag indicating that the storage is completed.

After the detection of the storage completion indication, the chip reset module resets the chip.

Step 3, the fault analysis module exports bus monitoring information from the memory, analyzes the exception reason and obtains an analysis result, and performs targeted protection and repair based on the analysis result.

Figure 7:
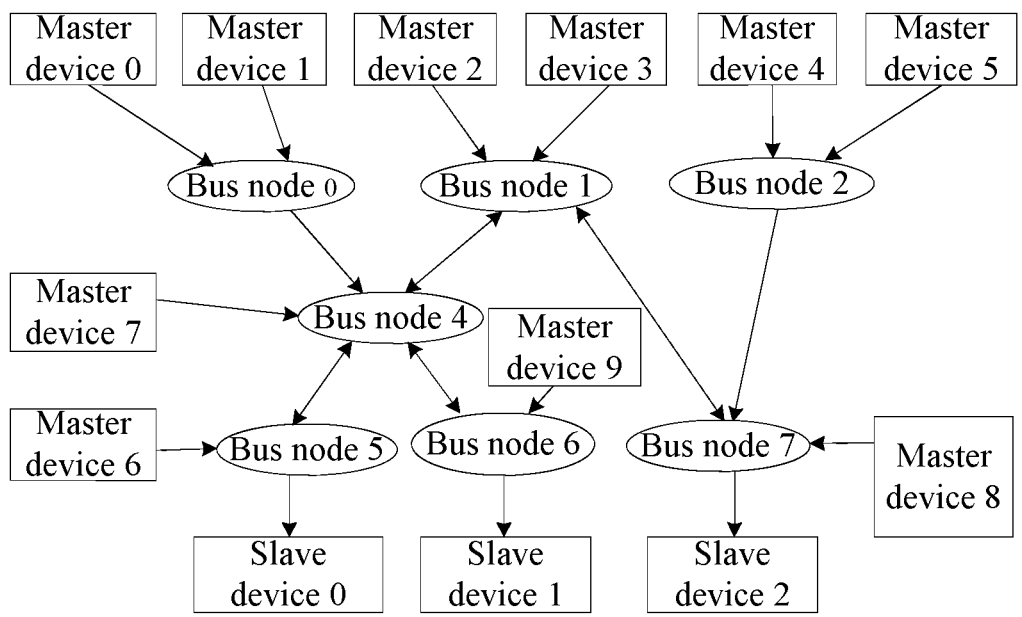
FIG. 7 is a diagram illustrating a structure of a bus topology of an embodiment of the present disclosure.

FIG. 7 is a diagram of a bus topology configuration illustrating a structure of an embodiment of the present disclosure.

Each master (master device) is connected to a bus node, wherein the bus nodes are interconnected, and finally connected to slave devices. For example, bus node 4 is connected to master 7, the nodes at the upper level of connection are bus node 0 and bus node 1, and the nodes at the lower level of connection are bus node 5 and bus node 6.

A chip bus subsystem numbers the masters and the monitoring nodes uniformly, monitors the bus nodes when the system runs, stores the bus node information, exports the monitoring bus node information in case of bus exceptions, analyzes the node information, connects the access numbers, and establishes an access model.

The present embodiment also includes the following examples.

Implementation One

The present implementation provides an embodiment for locating a bus exception by acquiring information using event mode.

Figure 8:
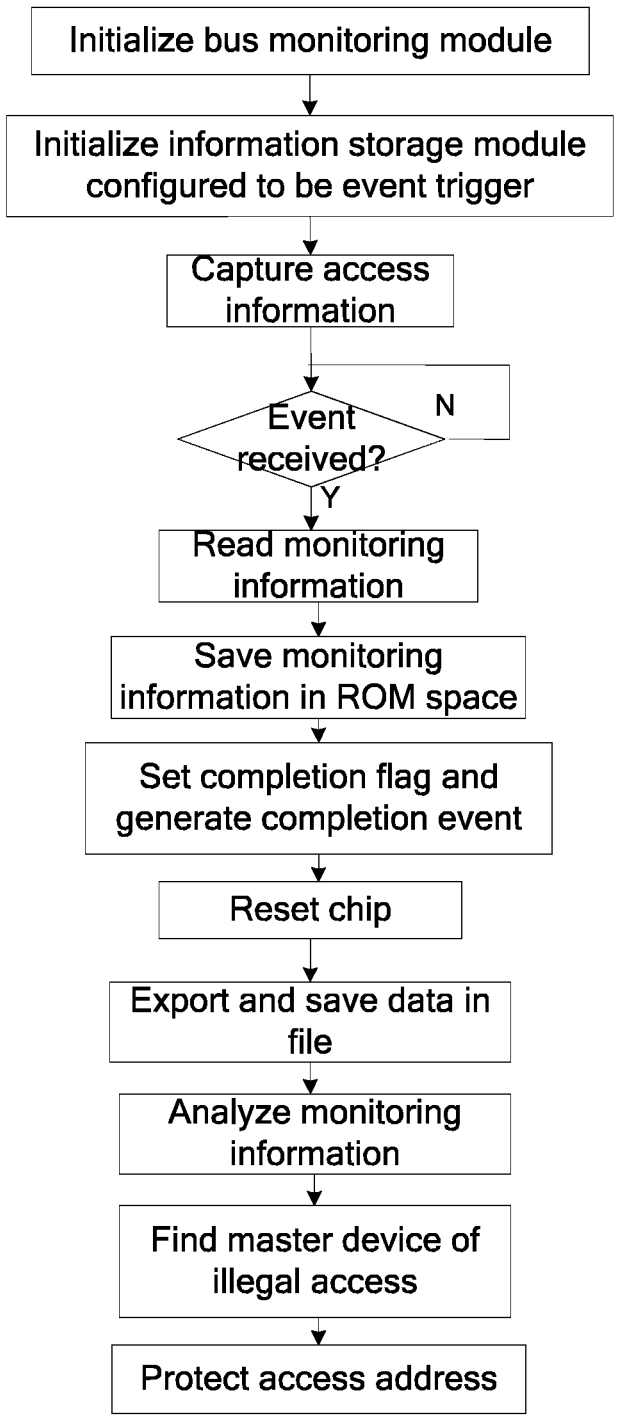
FIG. 8 is a flowchart illustrating a bus exception locating process using event mode according to an embodiment of the present disclosure.

FIG. 8 is a flowchart of locating a bus exception by using event mode according to an embodiment of the present disclosure, where the processing steps of the flow are as follows.

Step 1, initializing the bus monitoring module, configuring monitoring information for each bus node.

Serial numbers for masters and bus nodes are configured such to uniformly number the masters and nodes, respectively.

Address range for monitoring is configured to be address space of the whole chip.

Access attribute is configured to be read-write;

Monitoring mode is configured to be continuous monitoring mode;

Bus monitoring is enabled.

Step 2, initializing the information storage module.

Operation mode is configured to be event trigger;

Node range is configured to be all bus nodes;

Information is saved in on-chip ROM space.

Step 3, capturing access information. After Steps 1) and 2), the bus monitoring module starts to capture information, and each bus node saves the information into a capture register.

Step 4, saving the monitoring information.

In case of bus exceptions, the bus monitoring module generates an event and sends the event to the information storage module.

After receiving the event, the information storage module reads the monitoring information from the capture register of each bus node.

The monitoring information of each bus node is saved in a designated space, the information storage module sets a completion flag and generates a completion event after completing the storage.

Step 5, resetting chip.

The chip reset module executes chip reset after inquiring the setting of the completion flag or receiving the completion event.

After the chip is reset, the processor reads the monitoring information from the ROM and saves the information into a file.

Step 6, exporting and analyzing the monitoring information and locating the bus exception reason by a fault analysis module.

All the masters are traversed to read the serial numbers of bus nodes directly connected with the current master.

Access information of a corresponding bus node is read according to the serial number of the bus node;

The access information is analyzed to detect whether the current master initiates access to the bus node or not according to the master serial number.

If the access is initiated, it is judged whether the access address is in a legal range or not;

if the address is illegally accessed, at least one piece of the following information is recorded: master serial number, access address, access attribute; and The master accessing an illegal address can be found according to the recorded information.

Step 7, performing address protection on the master of the illegal access address.

Before the master initiates access, it is detected whether the access address is legal or not, wherein if the access address is illegal, prohibit access to the illegal address.

Implementation Two,

The present implementation provides an embodiment for locating bus exception by acquiring information using query mode.

Figure 9:
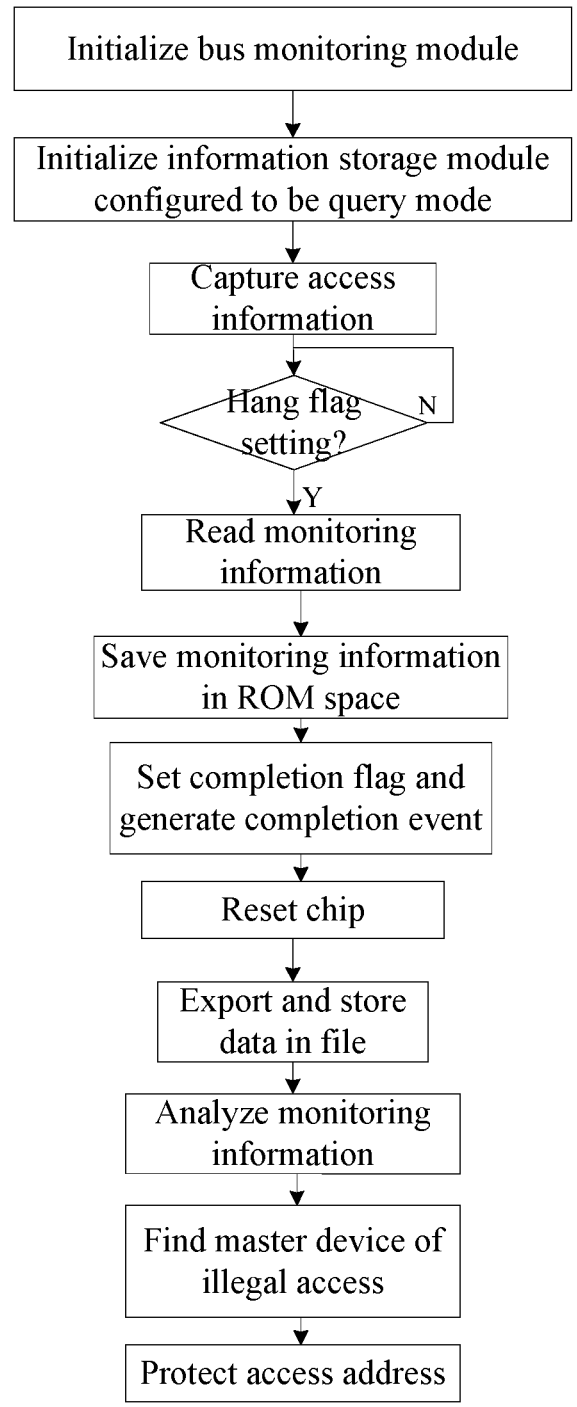
FIG. 9 is a flowchart illustrating a bus exception locating process using query mode according to an embodiment of the present disclosure.

FIG. 9 is a flowchart of locating a bus exception by using query mode according to an embodiment of the present disclosure, where the processing steps of the flow are as follows.

Step 1, the same as that of Implementation One

Step 2, initializing the information storage module

1) Operation mode is configured to be query mode
2) Node range is configured to be all bus nodes
3) Information is saved in off-chip ROM space Step 3, the same as that of Implementation One.

Step 4, saving monitoring information.

The information storage module periodically inquires a state register of the bus monitoring module, and if a state flag of a bus exception is inquired, the bus is abnormal;

the information storage module reads monitoring information from capture registers of the respective bus nodes;

the monitoring information of the respective bus nodes is saved in a designated space, and the information storage module sets a completion flag and generates a completion event after completing the saving;

Step 5, Step 6 and Step 7 are the same as those of Implementation One.

Implementation Three

Due to low access efficiency of multi-processor chip ROM, the implementation provides an embodiment for locating bus exceptions by using information saved in RAM. Generally, compared to the ROM embodiment, RAM has a higher speed.

Figure 10:
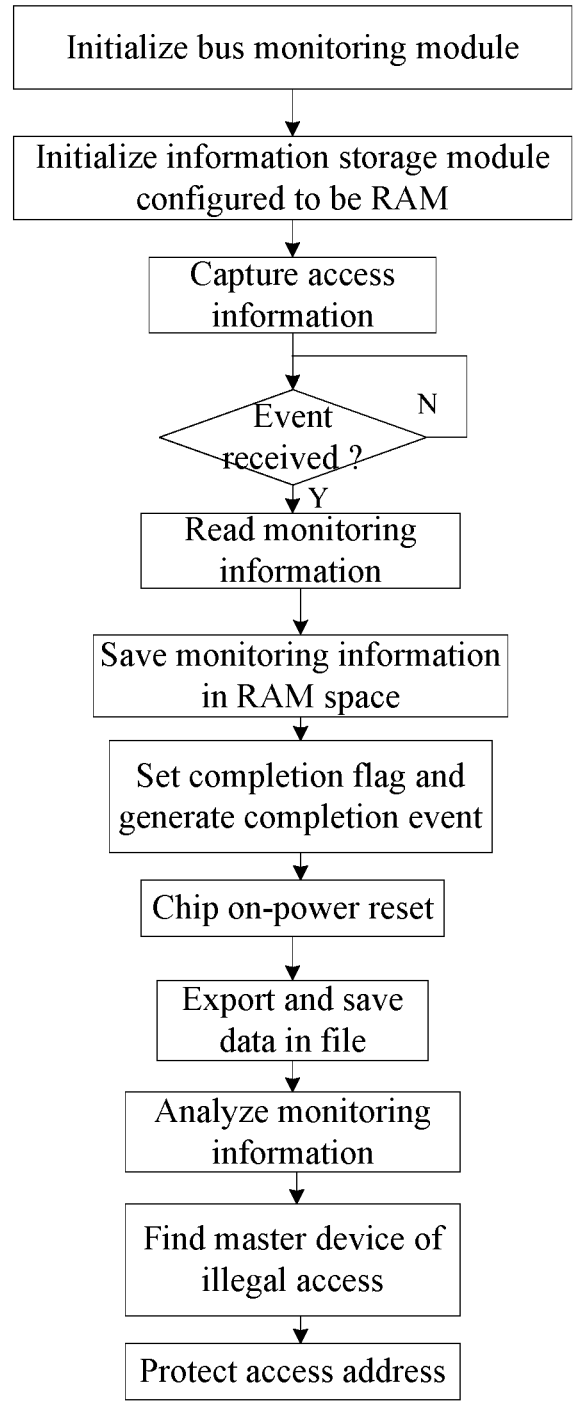
FIG. 10 is a flowchart illustrating a bus exception locating process using RAM storage information according to an embodiment of the present disclosure.

FIG. 10 is a flowchart illustrating a bus exception locating process by using information saved in RAM according to an embodiment of the present disclosure, and the processing steps of the flow are as follows.

Step 1, the same as that of Implementation One.

Step 2, initialize the information storage module.

Operation mode is configured to be event-trigger.

Node range is configured to be all bus nodes.

Information is saved in off-chip RAM space.

Step 3, the same as that of Implementation One

Step 4, save monitoring information

In case of bus exceptions, the bus monitoring module generates an event and sends the event to the information storage module.

After receiving the event, the information storage module reads monitoring information from capture registers of the respective bus nodes.

Under the condition of power-on reset, the monitoring information of the respective bus nodes is save in the RAM by utilizing the characteristic that the space content of the RAM does not lose, and the information storage module sets a completion flag and generates a completion event after completing the storage.

Step 5, reset the chip

The chip reset module executes chip reset after inquiring the setting of the completion flag or receiving the completion event.

If the RAM is an on-chip space, it is necessary to ensure that the chip reset type is power-on reset. If the RAM is an off-chip space, the chip where the memory is located is ensured to be power-on reset.

Step 6 and Step 7 are the same as that of Implementation One.

Implementation Four

The implementation provides an information storage module which, after started, save the bus monitoring information until a bus exception event is received.

Figure 11:
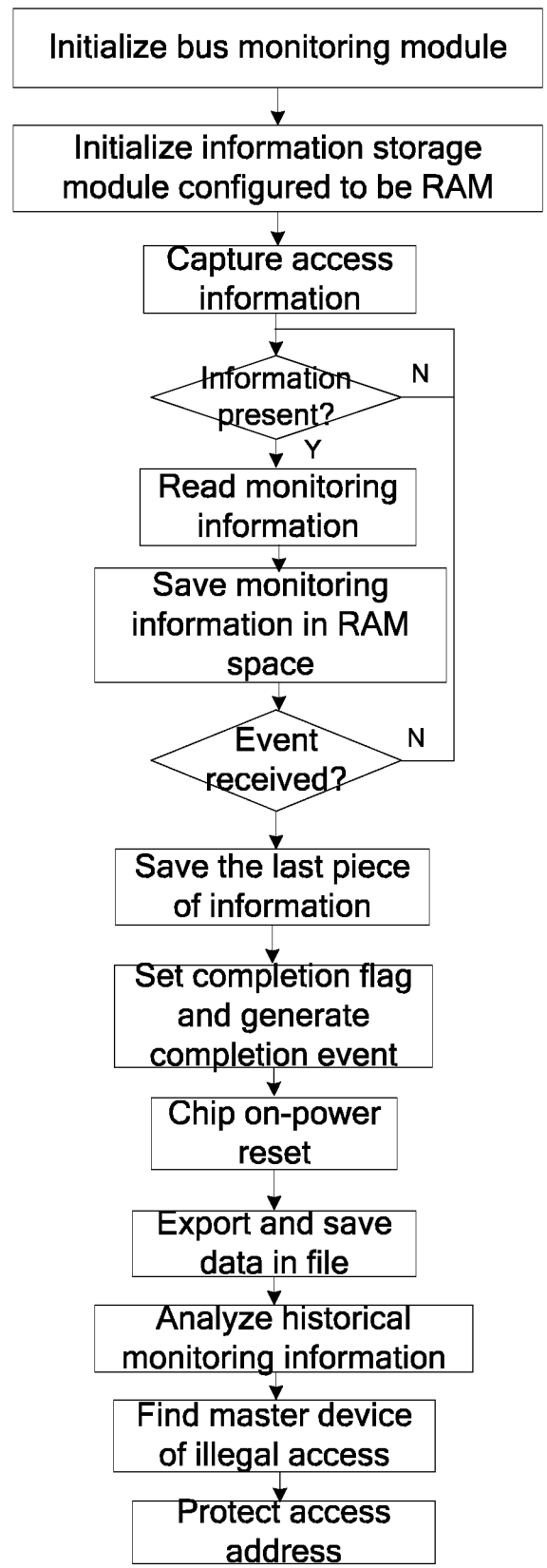
FIG. 11 is a flowchart illustrating a bus exception locating process using continuous storage mode according to an embodiment of the present disclosure.

The difference between the embodiment and the previous embodiments is that the embodiment can obtain more bus monitoring information, while Implementations One, Two and Three only obtain the last piece of information during bus exception. FIG. 11 is a flowchart illustrating a bus exception locating process using continuous storage mode according to the embodiment of the present disclosure. The present embodiment can locate bus exceptions in some more complex scenarios.

The processing steps of the flow are as follows.

Step 1, initialize the bus monitoring module, and configure monitoring information for each bus node.

Serial numbers for masters and bus nodes are configured such to uniformly number the masters and nodes, respectively.

Address range monitored is configured to be an address space of the whole chip.

Access attribute is configured to be read-write.

Monitoring mode is configured to be continuous monitoring mode.

Bus monitoring is enabled.

Step 2, initialize the information storage module

Operation mode is configured to be continuous storage, and the number of continuous storage is configurable.

Node range is all bus nodes.

Be saved in on-chip RAM space, start address and size of the space are set.

Step 3, the same as that of Implementation One.

Step 4, monitor information storage

When the information storage module detects that information is written into bus monitoring, the monitoring information is written into a corresponding RAM space.

Continuously saving with replacement is performed according to the start address and size of the RAM space When bus exception is triggered, the bus monitoring module generates an event number and informs the information storage module.

After the information storage module saves the last piece of information, the saving is stopped.

The information storage module sets a completion flag and generates a completion event after completing the saving.

And 5, reset the chip

After determining the state or receiving an event, the chip reset module executes on-power chip reset;

Step 6, the fault analysis module exports and analyzes the monitoring information to locate the bus exception reason.

The monitoring information is sequentially read until the last piece of information.

All masters are traversed to read the serial number of the bus node directly connected with the current master.

Historical access information of the corresponding bus node is read according to the serial number of the bus node.

Historical access information is analyzed to detect whether the current master initiates access or not according to the master serial number;

If the access is initiated, it is judged whether the access address is in a legal range or not;

If the address is illegally accessed, at least one piece of the following information will be recorded: master serial number, access address and access attribute;

The master accessing to an illegal address can found according to recorded information.

Step 7, perform address protection on the master of an illegal accessaddress.

Before the master initiates access, whether the access address is legal or not is detected. Access to the illegal address is prohibited.

By adopting the scheme of the embodiment, an information storage module, a second bus and a memory are added on the basis of the bus monitoring module, so that the bus monitoring information can be acquired in case of bus exceptions.

According to the acquired bus monitoring information, the fault analysis module locates bus exception reason quickly, performs protection and corrects errors according to the analysis result, thereby preventing bus exception from being triggered again and improving the stability of the system.

Fourth Embodiment

An embodiment of the present disclosure also provides a storage medium. Optionally, in the present embodiment, the storage medium may be configured to store a program code for performing steps of:

S1, monitoring the first bus where the bus monitoring module is located to generate monitoring information;

S2, acquiring monitoring information from the bus monitoring module through a second bus.

Optionally, in the present embodiment, the storage medium may include, but is not limited to, a U-disk, a Read-Only Memory (ROM), a Random Access Memory (RAM), a removable hard disk, a magnetic or optical disk, and various other media capable of storing program codes.

Optionally, in the present embodiment, the processor performs monitoring on the first bus where the bus monitoring module is located according to a program code stored in the storage medium, to generates monitoring information;

Optionally, in the present embodiment, the processor acquires the monitoring information from the bus monitoring module through the second bus according to the program code stored in the storage medium.

Optionally, specific examples of the present embodiment may refer to the examples described in the above embodiments and alternate implementations, which will not described herein again.

It is apparent to those skilled in this art that individual modules or steps of the present disclosure may be implemented by general-purpose computing devices, which may be integrated onto a single computing device, or distributed over a network composed of a plurality of computing devices. Optionally, the modules or steps may be implemented by program codes which are executable by computing devices, so that they can be stored in a storage device for execution by computing devices. In some cases, the illustrated or described steps may be performed in an order different from that described herein, or may be made into integrated circuit modules, or a plurality modules or steps among the modules or steps described herein may be made into a single integrated circuit module. As such, the present disclosure is not limited to any specific combination of hardware and software.

The above description is only a preferred embodiment of the present disclosure and is not intended to limit the present disclosure, and various modifications and changes may be made to the present disclosure by those skilled in the art. Any modification, equivalent substitutions, improvements within the spirit and principle of the present disclosure should be included in the scope of the present disclosure.

INDUSTRIAL APPLICABILITY

The present disclosure is applicable to the field of processor and is used for ensuring bus monitoring information be acquired in case of bus exceptions, which solves the technical problem that the bus monitoring information cannot be acquired in case of bus exceptions in the related art, and improves the bus node monitoring efficiency.

The invention claimed is:

1. A bus monitoring system, comprising:
a bus node;
a bus monitoring circuit configured to monitor a first bus where the bus monitoring circuit is located to generate monitoring information;
an information storage device configured to acquire the monitoring information from the bus monitoring circuit through a second bus;
the first bus configured to connect a master device and a slave device of the bus node; and
the second bus configured to connect the information storage device and the bus monitoring circuit,
wherein, the second bus is independent of the first bus;
wherein the system further comprises:
a chip reset circuit configured to execute a reset operation on a chip where the bus node is located, when detecting an indication that the monitoring information is saved; and
a fault analysis circuit configured to perform fault analysis based on the monitoring information.

2. The system of claim 1, wherein the second bus is further configured to expand a traffic flow of a path for a designated use.

3. The system of claim 1, wherein the system further comprises:
a storage device configured to save the monitoring information.

4. The system of claim 3, wherein the second bus is further configured to connect the information storage device and the storage device.

5. A bus monitoring method, comprising:
monitoring a first bus where a bus monitoring circuit is located to generate monitoring information;
acquiring the monitoring information from the bus monitoring circuit through a second bus;
wherein the second bus is independent of the first bus;
wherein after acquiring the monitoring information from the bus monitoring circuit through the second bus, the method further comprises: saving the monitoring information; and
wherein after saving the monitoring information, the method further comprises: executing a reset operation on a chip where a bus node is located, and after the reset operation is completed, performing fault analysis based on the monitoring information.

6. The method of claim 5, wherein the step of acquiring the monitoring information from the bus monitoring circuit through a second bus comprises one of:
acquiring the monitoring information from the bus monitoring circuit through the second bus according to event trigger;
acquiring the monitoring information from the bus monitoring circuit through the second bus according to query state; and
acquiring the monitoring information from the bus monitoring circuit through the second bus according to continuous storage.

7. The method of claim 5, wherein the step of executing the reset operation on the chip where the bus node is located comprises:
executing the reset operation on the chip where the bus node is located, when detecting an indication that the monitoring information is saved.

8. The method of claim 5, wherein the step of performing fault analysis based on the monitoring information comprises:

deducing an access model of the chip based on the monitoring information; and locating a fault type according to the access model.

9. The method of claim 5, wherein the step of performing fault analysis based on the monitoring information comprises:

traversing all master devices to read a serial number of the bus node directly connected with a current master device;

reading historical access information of a corresponding bus node according to the serial number of the bus node;

analyzing the historical access information to detect whether the current master device initiates access;

when the access is initiated, judging whether an access address is in a legal range or not;

when the access address is not in a legal range, recording at least one piece of the following node information: master device serial number, access address, and access attribute; and locating the master device of illegal access according to the node information.

10. The method of claim 5, wherein after performing fault analysis based on the monitoring information, the method further comprises:

determining a fault bus node;

when a current bus node initiates access, detecting whether an access address of the fault bus node is legal or not; and when the access address of the fault bus node is illegal, prohibiting access to the fault bus node.

11. The method of claim 5, wherein the step of monitoring the first bus where the bus monitoring circuit is located to generate the monitoring information comprises:

monitoring access information of the bus node through the first bus, and saving the access information to a bus monitoring circuit to obtain the monitoring information of the bus node.

12. The method of claim 5, wherein the step of acquiring the monitoring information from the bus monitoring circuit through a second bus comprises:

when current access information indicates that the bus node is abnormal, acquiring the monitoring information from the bus monitoring circuit through the second bus; and when the current access information indicates that the bus node is normal, acquiring the monitoring information from the bus monitoring circuit through the second bus.

13. A bus monitoring apparatus comprising:

a bus monitoring circuit configured to monitor a first bus where the bus monitoring circuit is located to generate monitoring information; and an acquisition circuit configured to acquire the monitoring information from the bus monitoring circuit through a second bus, wherein the second bus is independent of the first bus;

wherein the apparatus further comprises a storage device configured to save the monitoring information;

wherein the apparatus further comprises: a reset circuit configured to execute a reset operation on a chip where a bus node is located after the storage device saves the monitoring information; and an analysis circuit configured to, in response to completion of the reset operation, perform fault analysis based on the monitoring information.

14. The apparatus of claim 13, wherein the acquisition circuit comprises one of:

a first acquisition sub-circuit configured to acquire the monitoring information from the bus monitoring circuit through the second bus according to event trigger;

a second acquisition sub-circuit configured to acquire the monitoring information from the bus monitoring circuit through the second bus according to query state; and a third acquisition sub-circuit configured to acquire the monitoring information from the bus monitoring circuit through the second bus according to continuous storage.

15. The apparatus of claim 13, wherein the apparatus further comprises:

a determination circuit configured to determine a fault bus node after the analysis circuit performs fault analysis based on the monitoring information;

a detection circuit configured to detect whether the access address of the fault bus node is legal or not when a current bus node initiates access; and a processing circuit configured to prohibit access to the fault bus node when an access address of the fault bus node is illegal.

* * * * *